United States Patent [19]

Lang

[11] Patent Number: 5,061,430
[45] Date of Patent: Oct. 29, 1991

[54] METHOD FOR PRESS VULCANIZING OF EVEN MOIST ARTICLES

[75] Inventor: Aage Lang, Kolind, Denmark

[73] Assignee: Milliken Denmark A/S, Morke, Denmark

[21] Appl. No.: 257,459

[22] Filed: Oct. 13, 1988

[30] Foreign Application Priority Data

Jun. 30, 1988 [DK] Denmark .................. 3638/88

[51] Int. Cl.⁵ ............................ B29C 35/02
[52] U.S. Cl. ............................ 264/316; 156/87; 264/297.5; 264/314; 264/325; 425/389; 425/420; 425/812
[58] Field of Search ............ 264/241, 297.5, 314, 264/325, 316; 425/389, DIG. 812, 420, 394; 156/87

[56] References Cited

U.S. PATENT DOCUMENTS

| | | |
|---|---|---|
| 2,169,146 | 8/1939 | Iverson . |
| 2,663,902 | 12/1953 | Anderson . |
| 3,170,195 | 2/1965 | Knox ................................ 425/51 |
| 3,183,551 | 5/1965 | Johnson . |
| 3,311,951 | 4/1967 | Borchard et al. . |
| 3,671,159 | 6/1972 | Greenberg et al. ............ 425/245 |
| 3,825,378 | 7/1974 | Dart et al. ..................... 425/4 R |
| 4,336,221 | 6/1982 | Garabedian .................... 264/241 |
| 4,447,201 | 5/1984 | Knudsen ........................ 425/397 |
| 4,589,941 | 5/1986 | Tanaka et al. ................. 156/140 |
| 4,872,786 | 3/1975 | Holton .......................... 100/218 |

Primary Examiner—Jeffery Thurlow
Assistant Examiner—Mathieu Vargot
Attorney, Agent, or Firm—Earle R. Marden; H. William Petry

[57] ABSTRACT

Method for press vulcanizing, not only of dry, wholly or partly vulcanizable articles (1), such as auto rubber mats, piled rubber mats, etc., of a humidity of 0-3 weight percent but also of such articles (1) of a humidity of 3-5 weight percent or more, in the press zone of a vulcanizing press (P) having a shiftable part for closing and opening of the press (P) capable of applying a uniform surface pressure against any article (1) fed into the press. In that at least from the beginning of the vulcanizing operation to the end of it, a multitude of flow routes is established between the press shiftable part and each article (1) for vapors and gases released from each article (1), and a multitude of flow routes out from the press zone from where said vapors and gases may thus escape at least along part of the border of said press zone border, a method is brought about in which no vulcanizing heat is lost for heating of confined vapors and gases at high pressures.

4 Claims, 3 Drawing Sheets

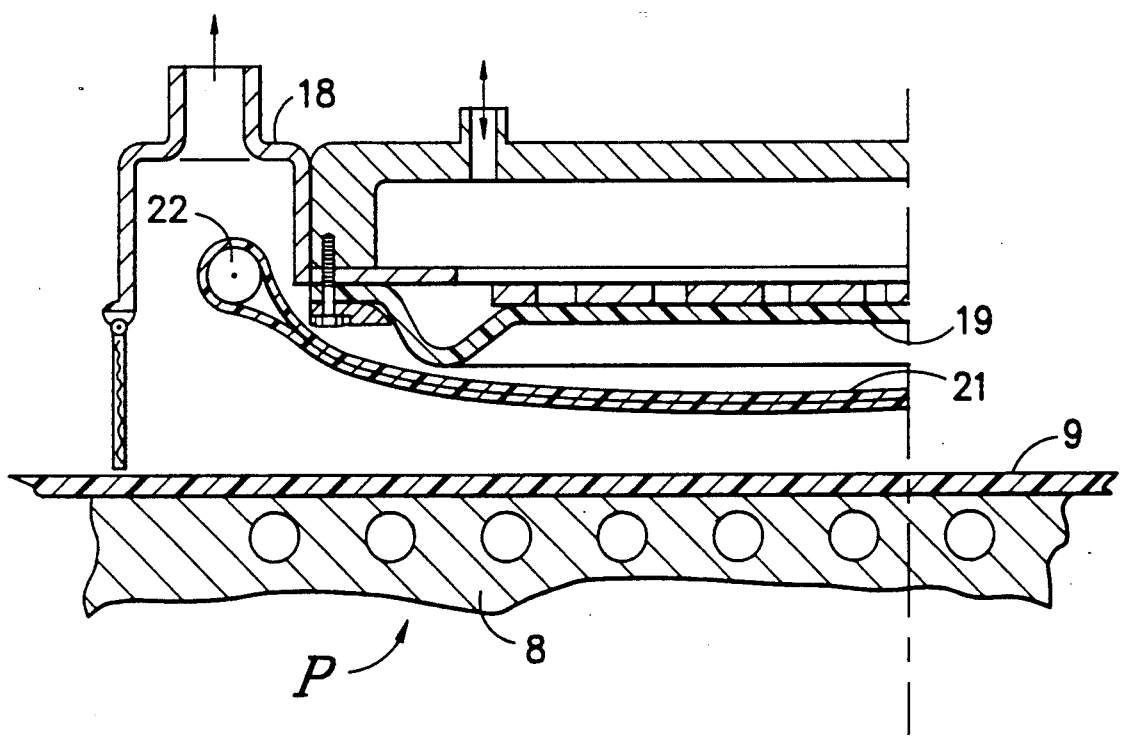
FIG. -1-

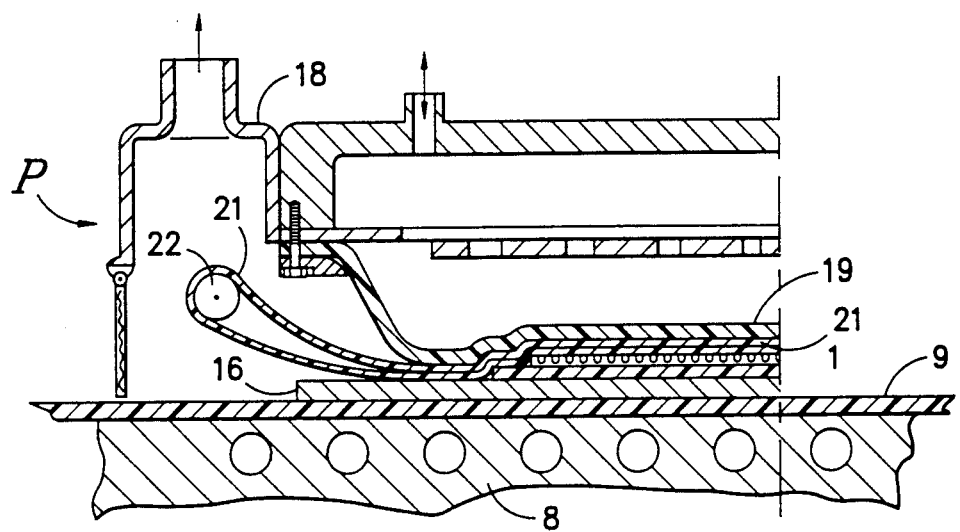
FIG. -2-
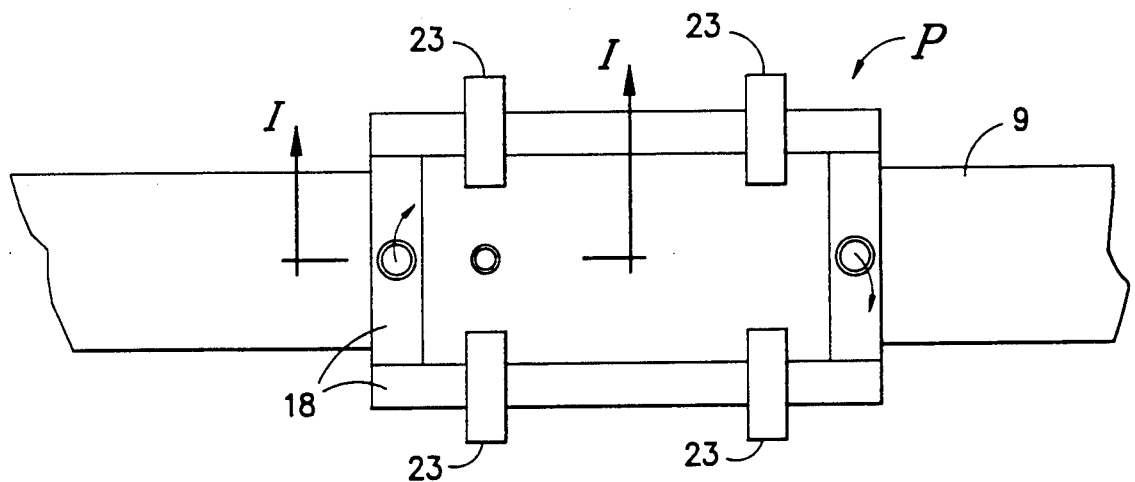
FIG. -3-
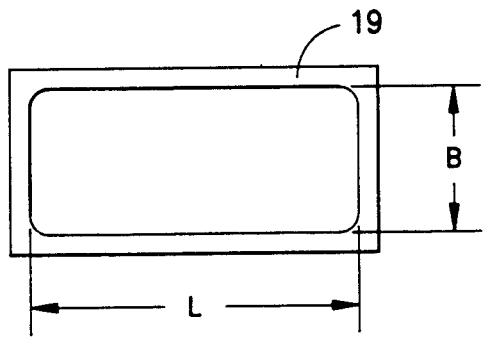
FIG. -4-

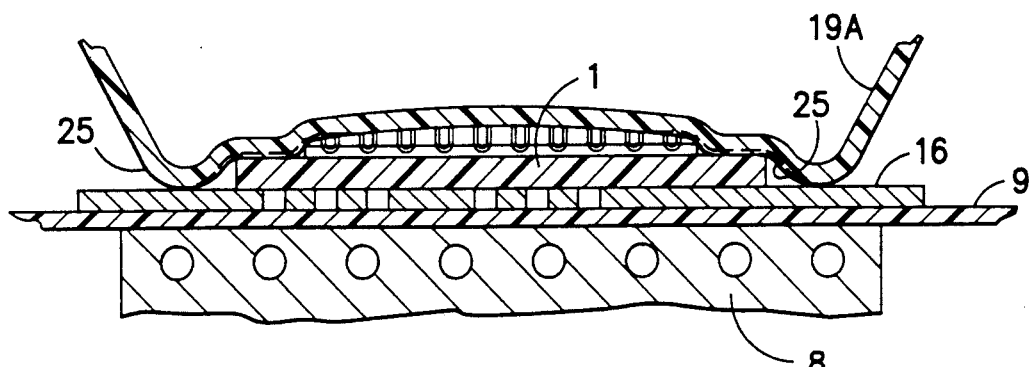
FIG. —5—
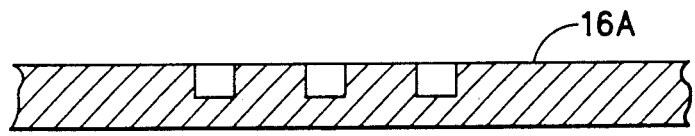
FIG. —6—
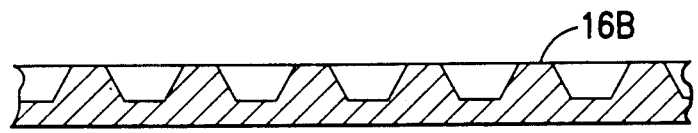
FIG. —7—
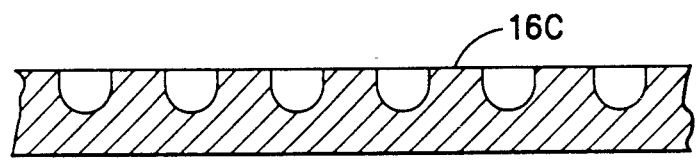
FIG. —8—
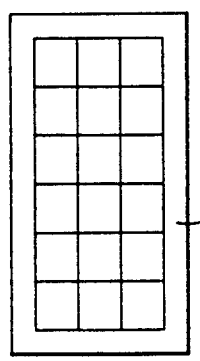
FIG. —9—
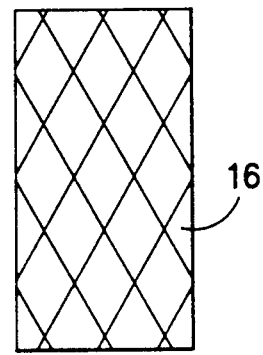
FIG. —10—

METHOD FOR PRESS VULCANIZING OF EVEN MOIST ARTICLES

This invention concerns a method for press vulcanizing, not only of a dry, wholly or partly vulcanizable article, such as auto rubber mats, piled rubber mats, etc., of a humidity of 0-3 weight percent but also of such article of a humidity of 3-5 weight percent or more, in the press zone of a vulcanizing press having a part shiftable for closing and opening of the press capable of applying a uniform surface pressure against any article fed into the press.

With known methods of this nature, with article of a humidity of more than 2 weight percent it has been necessary, to prevent a reduction in quality, especially in the surface of press vulcanized article, to dry the articles to a lower humidity before they were exposed to the vulcanizing press operation. The same pretreatment was given prior to the press vulcanizing operation for piled vulcanizable rubber mats where the pile adhesion to the mat rubber backing was reduced if the article was not dried to a humidity below 2 weight percent to vulcanizing.

It is the purpose of this invention to avoid said drawbacks and to provide a method for press vulcanizing so as to avoid predrying of the article, and through which article of an even relatively high humidity may be press vulcanized faultlessly. This is achieved through a method of the invention characteristic in that at least from the beginning of the vulcanizing press operation until it is finished, a multitude of flow routes is established between the shiftable part of the press and each article for vapours and gases released from each article, and a multitude of flow routes out from the press zone where said vapours and gases may thus escape, at least along part of the border of said zone. Whenever it is a case of piled rubber mats, no cushion of vapours and gases will be formed any longer between the shiftable part of the press and the vulcanizable rubber backing which vapour or gas confinement otherwise would prevent the pile from being pressed in effectively into the rubber backing before the vulcanizing of the latter.

In case the shiftable part of the press includes a press diaphragm, said flow routes may be established using a flow route forming means placed between the press diaphragm and each article.

The means forming said flow routes may be appropriately selected from the group of means consisting of: Open channels worked out in the diaphragm surface running out to the press zone exterior or border elevations worked out in the diaphragm surface, at least one cloth running along the diaphragm surface with indentations worked out in its surface facing away from the diaphragm where said indentations are limited by said elevations are formed of material harder than rubber, such as glass filaments, glass globes or similar heat resistant elements.

In case part of the article surface, for instance a pile layer, is inherently shaped with flow routes, at least the connection from the article flow routes and out of the press zone is established through said means.

Below, this invention will be further explained in relation to an embodiment and with reference to the drawing where FIG. 1 shows a part section through a vulcanizing press of the diaphragm type in section along I—I in FIG. 3 and with retracted press vulcanizing diaphragm, FIG. 2 shows what has been shown in FIG. 1 with an article fed for vulcanizing and with the press diaphragm in activated position, FIG. 3 shows the vulcanizing press shown in FIGS. 1 and 2 from a top view and with an article conveyor belt conducted through the press, FIGS. 4 shows a plane view of the press diaphragm shown in FIGS. 1 and 2.

FIG. 5 shows a press diaphragm with a flow route forming surface structure and an article conveyor plate with throughgoing openings for moulding of the article bottom, FIGS. 6, 7, and 8 show cross section through the article bottom shaping plates with non-throughgoing openings or grooves, and FIGS. 9, 10 show plane views of a couple of article moulding plates with grooves running continuously parallel with the plate sides and at an angle with the plate sides, resp.

FIG. 1 shows a vulcanizing press P, for instance of the kind known from U.S. Pat. No. 4,447,201 where a conveyor belt 9 for feeding into and removal from the press of one or more articles at a time for press vulcanizing between the heat-conveying conveyor belt 9 supported by a vulcanizing heater plate 8 and the press diaphragm 19 closely attached to the press top part through which the diaphragm rear side may receive a positive pressure for activation of the diaphragm compression moulding pressure and a negative pressure or vacuum for withdrawal or retracting of the diaphragm to its inactive position. Along the circumference of the press top part, as shown a roundgoing or encircling exhaust manifold 18 has been mounted to divert gases and vapours from the press vulcanized article. At the press top part, at each side of same a carrier 22 has been placed to an endless cloth 21 which will follow the diaphragm 19 movement during the press operation, for instance in that the rollers 22 are shiftable guided between the two positions shown in FIGS. 1 and 2.

FIG. 2 shows an article 1 fed into the press on a structural plate 16 for shaping of the article 1 rubber backing structure so that same is given innumerous projections or ribs in some pattern or other.

In FIG. 2, at least 50% of the total surface of the article, i.e. the part of the article surface facing the shiftable part of the vulcanizing part, i.e. the diaphragm 19, is covered by a means to form flow routes for vapours and gases released from each article, said means being in the form of the cloth 21 made of a material allowing such vapours and gases from the article 1 during the vulcanizing operation to escape along the cloth, possibly also through the cloth. The cloth is made to bear against the article 1 by only part of its full extent so that said vapours and gases may flow out from the press zone of the press along the exterior limitation or border zone of the latter and along the cloth surface.

Not later than at the beginning of the press operation, i.e. when the diaphragm 19 is depressed by a medium fluid pressure against the article 1 fed into the press, the cloth 21 is slackened so that it may adapt to the article shape during the press vulcanizing process. This slackening is done in that the rollers 22 around which the cloth 21 has been laid loosely at each of the two opposite sides of the press are parallel displaced in the direction towards the article fed into the press. At the same time, the cloth is displaced around the two rollers simultaneously reciprocally along its two runs.

The cloth 21 is made of a smooth, unstretchable, surface channel provided material, such as glass fibre reinforced teflon which will slide freely on the article surface, on rollers 22 and on the press work-shaping surface which in this case is the press diaphragm 19.

FIG. 3 shows the press from a top view with holding devices 23 for the press top part for transfer of the compression moulding pressure from the top part to the bottom part when the press diaphragm applies its compression moulding pressure.

FIG. 4 shows a plane view of the press diaphragm 19 the article-shaping surface of which has a length L and a width W. The part of the cloth 21 engaging with the press article-shaping surface, in this case the press diaphragm 19, has a length-width ratio L/W of 1.5-20, preferably 3.75. At high length/width ratios, i.e. higher than 3, the vapours and gases formed from the article or the articles 1 under the press diaphragm 19 will be most inclined to leave the press along the cloth 21 at the press length edges so that the exhaust manifold parts 18 at the short sides of the press may be spared.

FIG. 5 shows an embodiment of a press diaphragm 19A where at least part of the diaphragm exterior edge zone has been given a flow route forming surface structure 25, for instance in the form of an outlying on the diaphragm surface outside. Thus, the cloth 21 may be spared, as well as the rollers 22 and their relevant displacement devices. In the example shown, the article 1 is a piled rubber mat where the actual pile forms part of the flow route for vapours and gases out to the press zone border whereas the surface structure 25 of the diaphragm 19A forms the continuation of the flow routes so that vapours and gases from the entire article top may be conducted out of the press zone since the surface structure 25 for the diaphragm 19A prevents same from fitting completely tight in bearing against the moulding plate 16 for the article bottom.

Since no pockets of confined vapour or gas can be formed between the diaphragm 19A and the article 1, the article 1 pile layer is pressed more powerfully by the diaphragm down into the unvulcanized rubber layer of the article 1 during the vulcanizing press operation. Since the vapours quickly escape from the press zone, there will be no heat loss for heating of these, and this extra heat is utilized for a shorter vulcanizing duration, possibly under simultaneous plastic deformation of the article 1 bottom complementary to a surface structure providing base 16, in this case shown in the form of the plate 16 which has throughgoing openings 24 in the form of arbitrarily shaped holes or slits. Using the moulding plate 16, the article 1 bottom is deformed plastically into a shape complementary with this during the press vulcanizing operations. Instead of throughgoing openings of any cross sectional shape and pattern where the openings, as shown in FIG. 5, are closed by the underlying conveyor belt 9 which is preferably heat transferring, the base 16 may have only partly throughgoing openings of any cross section shape and pattern or grooves of any cross section shape and run as shown in FIGS. 6, 7, 8, 9, and 10. The base 16, 16A, 16B, 16C may be of metal, steel, silicone rubber or similar materials, possibly provided with a surface antiadhesive agent. Instead of the moulding plate 16, the actual conveyor belt 9 may have throughgoing openings of any cross section shape and pattern and pattern where the latter openings may be shaped as grooves of any cross section shape and run. Such conveyor belts may be of metal, steel, silicone rubber or similar materials, and may also be provided with a release agent.

Instead of glass fibre tissue 25, both at the diaphragm 19A outside and in the cloth 21 outside, small or rather microscopic glass globes may be embedded outlying in the surface, possibly covered by a thin teflon coat, said microscopic glass globes being known from reflex paints for road signs and number plates. Like glass fibre tissue, such glass globes produce a large number of elevations and indentations, together forming the flow routes for escape of vapours and gases required to apply the method.

I claim:

1. Method for press vulcanizing auto rubber mats, piled rubber mats and similar components in a vulcanizing press having a diaphragm for applying pressure to the component, a plate to support the component and a fabric movable into and out of relationship with the component located between the diaphragm and the plate comprising the steps of: placing a component to be vulcanized on the plate, energizing the press to cause the diaphragm and the component to move towards one another while simultaneously slackening the fabric to allow it to adapt to the shape of the component being vulcanized, vulcanizing the component while allowing gases and vapors generated during vulcanizing to escape around the edges of and through the fabric and moving the diaphragm and the component away from each other after vulcanization to allow the component to be removed from the press.

2. The method of claim 1 wherein the fabric is in the form of an endless belt and is located on a pair of spaced rollers, the runs of the endless belt being allowed to move in opposite directions to each other as it is moved into engagement with the component being vulcanized.

3. The method of claim 2 wherein the portion of the fabric in contact with component is provided with a length-width ratio of 1.5-20.

4. The method of claim 3 wherein the length-width ratio is 3.75.

* * * * *